United States Patent
Li et al.

(10) Patent No.: US 7,379,595 B2
(45) Date of Patent: May 27, 2008

(54) MANUAL WINDOWING WITH AUTO-SEGMENTATION ASSISTANCE IN A SCANNING SYSTEM

(75) Inventors: Xing Li, Webster, NY (US); John F. Seward, Jr., Dansville, NY (US); Mihai Cuciurean-Zapan, Fairport, NY (US); Gene M. Nitschke, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 914 days.

(21) Appl. No.: 10/851,192

(22) Filed: May 24, 2004

(65) Prior Publication Data

US 2005/0259871 A1 Nov. 24, 2005

(51) Int. Cl.
G06K 9/34 (2006.01)
(52) U.S. Cl. ............ 382/180; 358/453; 358/462; 382/173
(58) Field of Classification Search ............ 382/180
See application file for complete search history.

(56) References Cited

U.S. PATENT DOCUMENTS

| | | | | |
|---|---|---|---|---|
| 5,406,389 A * | 4/1995 | Hasegawa et al. | ........... | 358/452 |
| 5,537,223 A * | 7/1996 | Curry | ........... | 358/3.28 |
| 5,552,900 A * | 9/1996 | Someya | ........... | 358/452 |
| 5,572,599 A * | 11/1996 | Tse | ........... | 382/162 |
| 5,604,879 A * | 2/1997 | Beavers et al. | ........... | 711/207 |
| 5,684,891 A * | 11/1997 | Tanaka et al. | ........... | 382/178 |
| 5,689,509 A * | 11/1997 | Gaytan et al. | ........... | 370/396 |
| 5,732,162 A * | 3/1998 | Curry | ........... | 382/294 |
| 5,765,029 A * | 6/1998 | Schweid et al. | ........... | 706/52 |
| 5,778,156 A * | 7/1998 | Schweid et al. | ........... | 706/52 |
| 5,793,427 A * | 8/1998 | Mills et al. | ........... | 348/391.1 |
| 5,852,678 A * | 12/1998 | Shiau et al. | ........... | 382/176 |
| 5,892,841 A * | 4/1999 | Jochems et al. | ........... | 382/152 |
| 6,137,907 A * | 10/2000 | Clark et al. | ........... | 382/180 |
| 6,157,736 A * | 12/2000 | Jodoin et al. | ........... | 382/173 |
| 6,345,118 B1* | 2/2002 | Ideyama | ........... | 382/175 |
| 6,389,163 B1* | 5/2002 | Jodoin et al. | ........... | 382/173 |
| 6,396,951 B1* | 5/2002 | Grefenstette | ........... | 382/187 |
| 6,429,950 B1* | 8/2002 | Ebner | ........... | 358/1.9 |
| 6,480,626 B1* | 11/2002 | Venable | ........... | 382/180 |
| 6,522,791 B2* | 2/2003 | Nagarajan | ........... | 382/321 |
| 6,625,312 B1* | 9/2003 | Nagarajan et al. | ........... | 382/176 |
| 6,901,155 B2* | 5/2005 | Xia et al. | ........... | 382/125 |
| 7,061,645 B2* | 6/2006 | Chang | ........... | 358/1.9 |
| 2002/0097452 A1* | 7/2002 | Nagarajan | ........... | 358/505 |
| 2002/0159641 A1* | 10/2002 | Whitney et al. | ........... | 382/219 |
| 2002/0159642 A1* | 10/2002 | Whitney | ........... | 382/225 |
| 2002/0164070 A1* | 11/2002 | Kuhner et al. | ........... | 382/159 |
| 2004/0263908 A1* | 12/2004 | Jacobs et al. | ........... | 358/2.1 |
| 2005/0169505 A1* | 8/2005 | Xia et al. | ........... | 382/125 |
| 2006/0072817 A1* | 4/2006 | Lee et al. | ........... | 382/173 |
| 2006/0152764 A1* | 7/2006 | Loce et al. | ........... | 358/3.06 |
| 2007/0116347 A1* | 5/2007 | Hong | ........... | 382/131 |

* cited by examiner

*Primary Examiner*—Matthew C Bella
*Assistant Examiner*—Sath V. Perungavoor
(74) *Attorney, Agent, or Firm*—Oliff & Berridge, PLC

(57) ABSTRACT

A manual windowing with auto-segmentation assistance method and system are disclosed that include defining manual tags to be assigned to one or more windows via a tag selection module, assigning the defined manual tags to the one or more windows via a manual tag assignment module and auto-segmenting the one or more windows within the display medium by producing auto-segmentation tags via the auto-segmentation module. Furthermore the method and system according to this invention provide for mapping tags to the auto-segmentation tags via a tag mapping module and merging the manual tags and the auto-segmentation tags via a merging module.

9 Claims, 2 Drawing Sheets

MANUAL WINDOWING WITH AUTO-SEGMENTATION ASSISTANCE IN A SCANNING SYSTEM

BACKGROUND OF THE INVENTION

1. Field of Invention

This invention is related to scanning systems in general, and in particular to combined manual windowing and auto-segmentation.

2. Description of Related Art

Manual windowing generally enables the assignment of user-defined tags to one or more windows or bounded regions within a scanned page. These user-defined tags control the processing of the windows to which they are assigned, and thus provide custom rendering adjustment of each scanned page. In order to obtain good image quality in digital reproduction of documents, regions in the scanned original document with different characteristics, such as, for instance, continuous tone pictures, halftones of different frequencies, error diffused images, text, and the like, may need different treatment. Auto-segmentation classifies each pixel in the input image into one of several classes in a way that optimal processing and rendering can be performed. Examples of patents using auto-segmentation can be found in U.S. Pat. Nos. 6,178,260 and 6,181,829, the entire disclosures of which are incorporated by reference herein.

SUMMARY OF THE INVENTION

While providing custom rendering adjustment, manual windowing presents some limitations. For instance, in the manual windowing approach, it is difficult to specify different treatments for different patterns or objects inside a specific window. Accordingly, if a user specifies, for instance, that a region should be a high frequency half-tone and elects to apply a de-screened filter to the region, then the de-screening filter is applied to the entire window, including all the other objects or patterns present in the window, such as text, drawings or photographs. Applying a de-screening filter to the entire window may result in an image with less than optimal quality.

In light of these limitations, various exemplary embodiments of the systems and methods according to this invention provide a combination of manual windowing with auto-segmentation assistance that includes defining at least one manual tag to be assigned to at least one window within a display medium, assigning the defined manual tag to at least one window, and auto-segmenting the at least one window to which the defined manual tag is assigned to produce at least one auto-segmentation tag. After defining and assigning the manual tag(s) and producing the auto-segmentation tag(s), the manual tag(s) may be mapped to the auto-segmentation tags. According to various exemplary embodiments of this invention, the manual windowing tags and the auto-segmentation tags may be mapped to a common tag definition, via mapping tables, that is known to the downstream processing modules. In other words, it is possible that both manual and auto tag can be mapped through a different table to a common tag definition. Then the manual tag(s) may be merged with the auto-segmentation tag(s).

Various exemplary embodiments of the systems according to this invention provide an enhanced manual windowing system that includes a tag selection module that selects at least one manual tag that is to be assigned at least one window within a display medium, a manual tag assignment module that assigns the selected manual tag to at least one window, and a tag auto-segmentation module that segments the at least one window to produce at least one auto-segmentation tag. The system may also include a tag mapping module that maps the assigned manual tag(s) to the auto-segmentation tag(s). The system may further include a merging module that merges the manual tag(s) and the auto-segmentation tag(s).

Further, various exemplary embodiments of this invention provide a machine readable medium that provides: instructions for manual windowing, the instructions, when executed by a processor, causing the processor to perform operations that include defining at least one manual tag to be assigned to at least one window within a display medium and assigning the defined manual tag to at least one window; and, instructions for auto-segmentation, the instructions, when executed by a processor, causing the processor to perform operations that include auto-segmenting the at least one window to which the defined manual tag is assigned to produce at least one auto-segmentation tag. The machine readable medium may also provide instructions that, when executed by a processor, cause the processor to map the manual tag(s) to the auto-segmentation tag(s). The machine readable medium may further provide instructions that, when executed by a processor, cause the processor to merge the manual tag(s) and the auto-segmentation tag(s).

Further, various exemplary embodiments of this invention provide a xerographic marking device with a controller that includes a tag selection module that selects at least one manual tag to be assigned to at least one window within a display medium, a manual tag assignment module that assigns the selected manual tag to at least one window, and a tag auto-segmentation module that segments the at least one window to produce at least one auto-segmentation tag. The controller may also include a tag mapping module that maps the assigned manual tag(s) to the auto-segmentation tag(s). The controller may further include a merging module that merges the manual tag(s) and the auto-segmentation tag(s).

BRIEF DESCRIPTION OF THE DRAWINGS

Various exemplary embodiments of the systems and methods of this invention will be described herein in detail, with references to the following figures, wherein.

DETAILED DESCRIPTION OF EXEMPLARY EMBODIMENTS

These and other features and advantages of this invention are described in, or are apparent from, the following detailed description of various exemplary embodiments of the systems and methods according to this invention.

Figure 1:
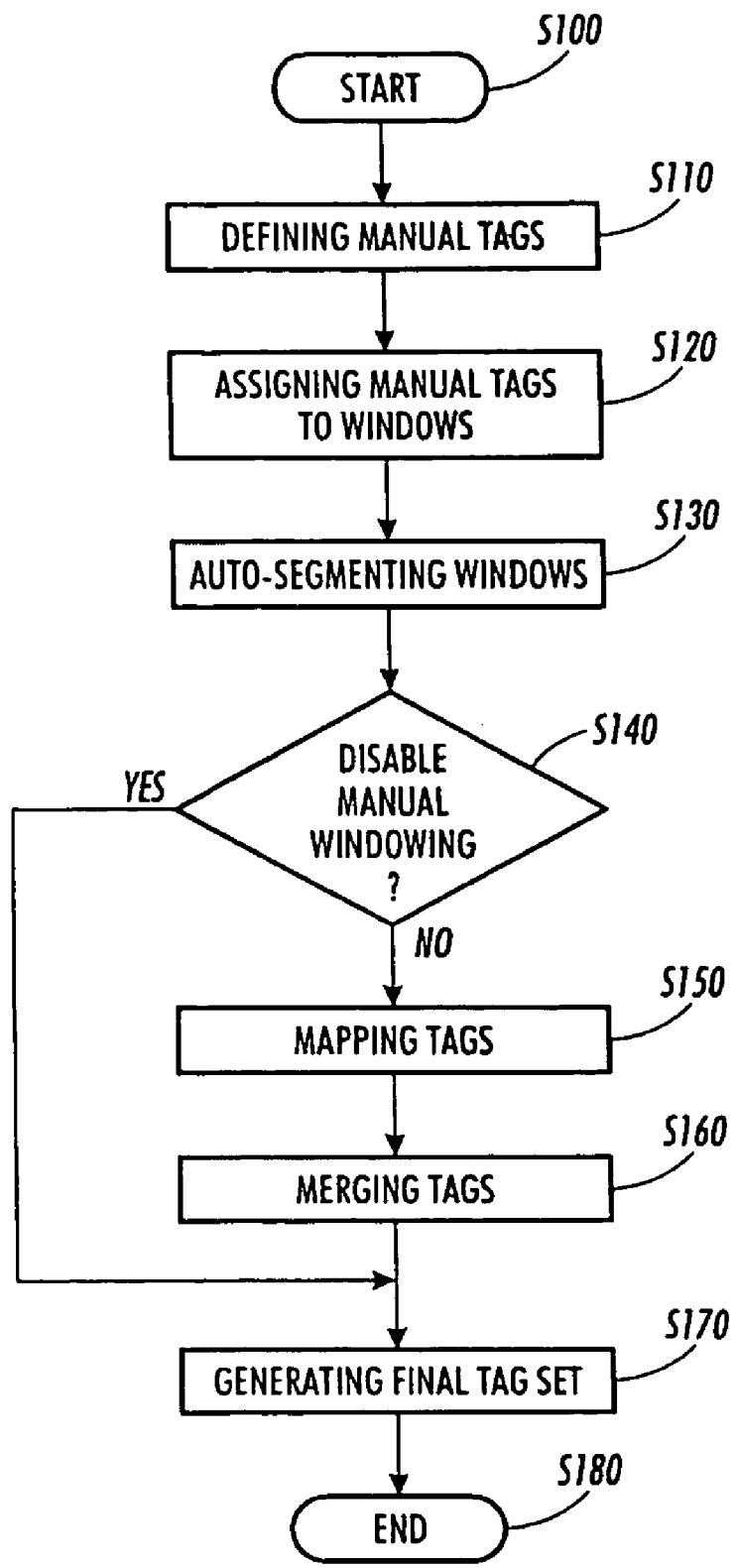
FIG. 1 is a flowchart illustrating an enhanced manual windowing method according to various exemplary embodiments of this invention.

FIG. 1 is a flowchart illustrating an enhanced manual windowing method according to various exemplary embodiments of this invention. In FIG. 1, control starts at step S100 and continues to step S110, where manual tags are defined by a user. For example, a user can define manual tags through the following procedure: the user specifies the coordinates of a window by selecting a region of the image via, for example, a graphical user interface (GUI) bounding box, and specifying the rendering intent, such as the type of window, the region, the filter(s) to use, the toner reproduction curve (TRC) to use, and the like. These user-defined manual tags, which may correspond to individual pixels, are to be assigned to one or more windows within a display medium displaying; for example, a scanned page. Next, control continues to step S120 where the manual tags defined by the user in step S110 are assigned to one or more windows within the display medium. According to various exemplary embodiments, the manual tags may be assigned by hardware. In the case of auto-segmentation, each pixel will have a corresponding tag specifying how the pixel should be treated. In the case of manual windowing, the hardware may assign the manual tag to each pixel based on the coordinates and rendering intent specified by the user.

Control continues to step S130. In step S130, the one or more windows are auto-segmented. According to various exemplary embodiments, auto-segmentation is performed either via the use of look-up tables, or via the use of algorithms. In step S130, because it is generally operationally impractical to have a user manually assign tags to an image on a pixel-by-pixel basis, the entire image is generally first auto-segmented on a pixel-by-pixel basis, where a pixel may be classified as being, for example, a text pixel, and the neighboring pixel may be classified as, for example, a high-frequency halftone pixel. According to various exemplary embodiments, auto-segmentation is used in order to accelerate the windowing process. Manual windowing can usually only assign a tag to a specific region, for example, based on the bounding box limitations of the GUI. Moreover, auto-segmentation may mis-assign specific pixels by, for example, mistakenly classifying pixels in a high frequency halftone region as being low frequency halftone. However, auto-segmentation allows, to a large extent, to more readily automate the tag assignment process for the user. Assuming that a user knows the specific type of a given region, manual specification is more accurate than auto-segmentation. On the other hand, auto segmentation provides useful information, such as text, text on image (text-in-tint), edge, and the like, that is difficult to specify via manual windowing. Thus, the benefits of both auto-segmentation and manual segmentation can be obtained.

It should be noted that, although the steps of defining manual tags S110 and assigning manual tags to windows S120 are described above as preceding the step of auto-segmenting windows S130, according to various exemplary embodiments of the methods of this invention, the step of auto-segmenting windows S130 could precede the steps of defining manual tags S110 and assigning manual tags to windows S120. Further, auto-segmentation and manual windowing may run in parallel. Thus, any suitable order of steps may be implemented.

Control continues to step S140. In step S140, a determination is made whether or not to disable manual windowing. Because the system can be designed to handle different applications or workflows, in some cases a user may, according to various exemplary embodiments, choose not to perform manual windowing and let auto-segmentation control the processing. For example, providing this functionality allows the user to eliminate the requirement of programming a manual window. According to various exemplary embodiments, disabling auto-segmentation is also possible, where a user assigns a single tag to all the regions located outside of the manual windows. According to alternative exemplary embodiments, auto-segmentation is used in the regions outside of manual windows. Thus, a user has the control and the ability to turn auto-segmentation on and off as needed. If it is determined that manual windowing should be disabled, then control jumps to step S170, where final tags are generated. According to various exemplary embodiments, the final tags generated in step S170, when manual windowing has been disabled in step S140, simply correspond to the auto-segmentation tags from step S130. As such, disabling manual windowing in step S140 will result in the one or more windows not being manually segmented.

If a determination is made not to disable manual windowing, then control continues to step S150, where the manual tags are mapped to the auto-segmentation tags. According to various exemplary embodiments, mapping the manual tags to the auto-segmentation tags includes determining, within one or more windows, which pixels will automatically be segmented and which pixels will be manually segmented. In other words, mapping the manual tags to the auto-segmentation tags allows for the determination of whether a pixel is assigned an auto-segmentation generated tag or whether a pixel is assigned a manual windowing tag. For example, if text appears in a given window on top of a background (text-in-tint), then the text pixels will be manually segmented. According to various exemplary embodiments, mapping the manual tags to the auto-segmentation tags is performed via the use of mapping tables.

According to various exemplary embodiments, the manual tags that are defined in step S110 are eight-bit wide tags. The 6 least significant bits (LSB) allow for assigning 64 possible rendering intents such as, for instance, fine halftone, text, and the like, to the manually windowed regions. The two most significant bits (MSB) allow four (4) states for controlling the merging of manual and auto-segmentation tags. Also, according to various exemplary embodiments, the six least significant bits of the manual tags are used to carry rendering information. Accordingly, since six bits allow for 64 different states (i.e., from 000000 to 111111, or in decimal from 0 to 63), up to 64 different types of processing types are thus available. These different types can be, for example, different combinations of filters, TRCs, rendering methods, and the like. The two most significant bits of the manual tags may be used to control the merge with the auto-segmentation tags. Finally, according to various exemplary embodiments of the methods of this invention, the one or more windows within the display medium are text-in-tint windows.

After the manual tags are mapped to the auto-segmentation tags in step S150, control continues to step S160, where the manual tags and the auto-segmentation tags are merged. According to various exemplary embodiments, the merging of the manual tags and the auto-segmentation tags is controlled by the 2 MSBs discussed above and a multiplexer (MUX). A MUX typically takes in multiple inputs and selects one of the multiple inputs as an output based on a control value. According to various exemplary embodiments of this invention, two possible inputs (auto-segmentation tags and manual windowing tags) and one output makes the control binary, either 0 or 1. A table may be used to govern the creation of 0 or 1 for the control value for each window. Next, control continues to step S170, where the final tags are generated. According to various exemplary embodiments of this invention, the final tags correspond to a combination of the auto-segmentation tags and the user-defined manual tags.

Figure 2:
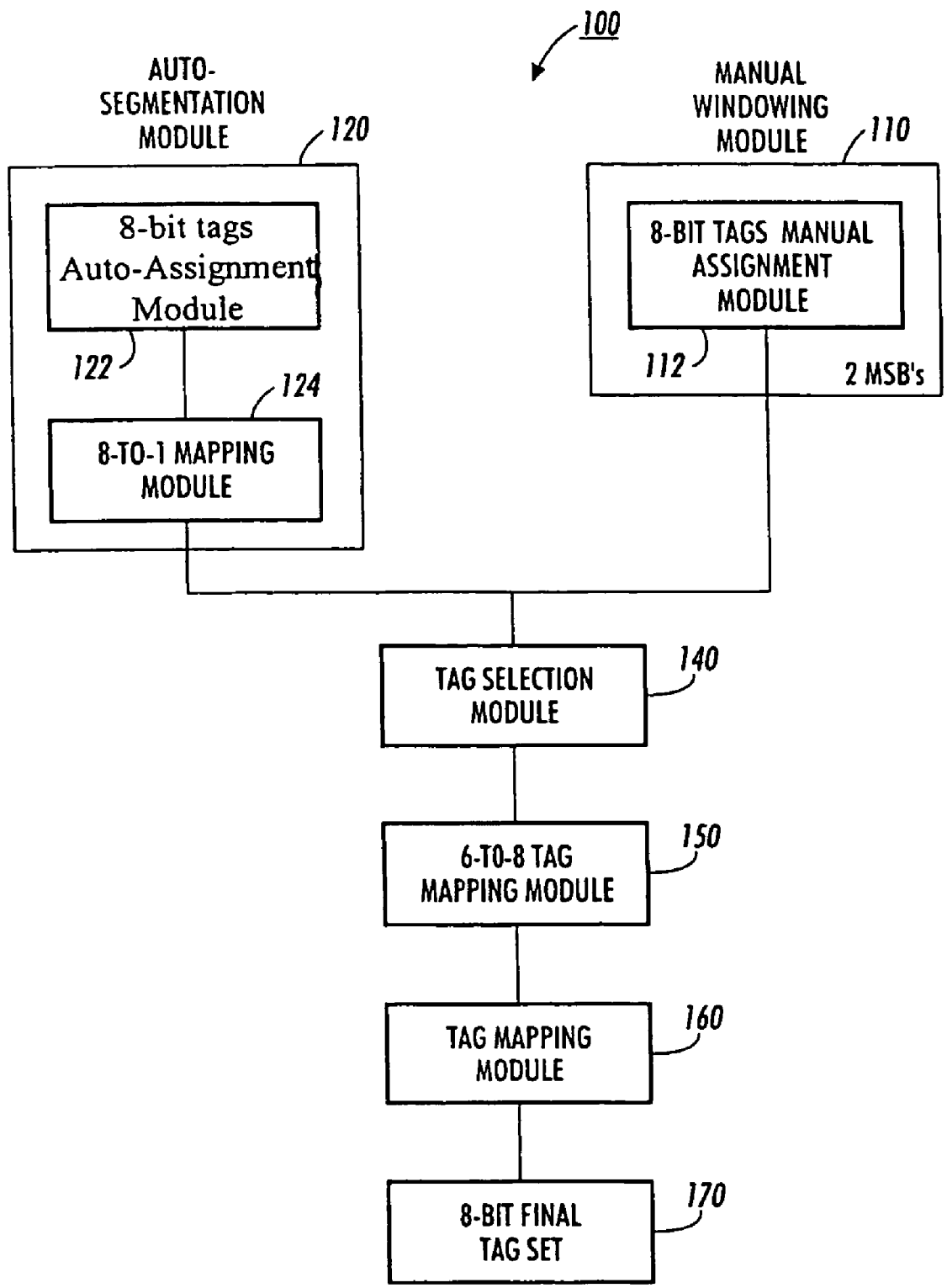
FIG. 2 is a block diagram illustrating an enhanced manual windowing with system according to various exemplary embodiments of this invention.

FIG. 2 is a block diagram illustrating an enhanced manual windowing system 100 according to various exemplary embodiments of this invention. As shown in FIG. 2, the system 100 includes a manual windowing module 110 and an auto-segmentation module 120. Both the manual windowing module 110 and the auto-segmentation module 120 produce tags which are transmitted to a tag selection module 140, then mapped via a 6-to-8 tag mapping module 150. One of the purposes of this invention is to reach a common definition of the tags, so that downstream modules, such as, for example, the tag merging module 160, are able to read the tags. According to various exemplary embodiments, the auto-segmentation module 120 includes an 8-bit tags assignment module 122 and an 8-to-1 mapping module 124. According to various exemplary embodiments, the 8-to-1 mapping module 124 extracts tag information from the 8-bit tags auto-assignment module 122.

Moreover, according to various exemplary embodiments of this invention, the manual windowing module 110 includes the 8-bit manual tags assignment module 112, which allows the assignment of tags manually by a user and that contain 2 MSBs. The 8-bit manual tags assignment module 112 allows the determination of whether a pixel will be assigned a manual tag only, whether the pixel will be automatically segmented via an automatic tag only, or whether the pixel will be assigned a tag that corresponds to a combination of auto-segmentation and manual windowing via the 2 MSBs. One function of the 2 MSBs in the manual tag is to carry tag information and specify the user-intent in, for example, determining whether to let the auto-segmentation tag to be used on a specific region or pixel. In an exemplary embodiment, the 2 MSBs are used to select between two types of mapping: the first type of mapping comprises, in various exemplary embodiments, blocking all auto-segmentation tags; the second type of mapping comprises, in various exemplary embodiments, allowing some combination of manual segmentation and auto-segmentation tags.

The tag selection operation is based on the information present in both the manual tag and the auto segmentation tag for a particular pixel. These two pieces of information are transmitted to the tag selection module 140, which selects the tag for a specific pixel or a specific region based on the user intent specified in the MSBs. The tag selection module, according to various exemplary embodiments, selects one of three available options: the first option is to use the auto-segmentation tag only; the second option is to use the manual tag only; and the third option is to use a combination of the auto-segmentation tag and of the manual tag.

The tag selection module 140 is functionally connected to the 6-to-8 tag mapping module 150, which, according to various exemplary embodiments, performs two functions: the first function is to determine whether or not to implement the auto-segmentation/manual windowing combination; and the second function is to map the manual tags to tags that can be read by the downstream modules.

The tag mapping module 150 is functionally connected to a tag merging module 160 in order to allow merging of the mapped manual tags and auto-segmentation tags. A more general expression of the merging of the tags described above is to assume M bits for the manual tag and N bits for the auto-segmentation tag, which will result in (M+N=) O mapping bits to generate the final tag. Finally, according to various exemplary embodiments of this invention, the tag merging module 160 generates a set of final tags 170.

According to various exemplary embodiments of the systems and methods of this invention, the results of manual windowing may be merged with the results of auto-segmentation via the use of look-up tables in order to generate a final output tag, based on both manual window specification and auto-segmentation information. The look-up tables may be used based on the definition of a specific pixel within a window, for example, a text pixel or an image pixel.

As shown in FIG. 2, the modules can each be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

While the invention has been described in conjunction with exemplary embodiments, these embodiments should be viewed as illustrative, not limiting. Various modifications, substitutes, or the like are possible within the spirit and scope of the invention.

What is claimed is:

1. An enhanced manual windowing method, comprising:
defining at least one manual tag to be assigned to at least one window within a display medium;
assigning the defined manual tag to the at least one window;
auto-segmenting the at least one window to which at least one manual tag is assigned to produce at least one auto-segmentation tag;
mapping the at least one manual tag to the at least one auto-segmentation tag;
merging the at least one manual tag and the at least one auto-segmentation tag; and
generating a final tag set based on the merging of manual and auto-segmentation tags, wherein one or more least significant bits of the manual tags are used to carry rendering, and one or more most significant bits of the manual tags are used to control the merge with the auto-segmentation tags.

2. The method of claim 1, wherein defining at least one manual tag comprises defining an eight-bit wide tag.

3. The method of claim 1, wherein mapping the at least one manual tag to the auto-segmentation tag is performed with the use of mapping tables.

4. An enhanced manual windowing system, comprising:
a tag auto-segmentation module that generates a tag for each pixel within one or more windows within a display medium;
a manual windowing module that assigns a manual tag to the one or more windows within the display medium;
a tag selection module that selects a tag to be assigned to the one or more windows within the display medium from the tags generated by the auto-segmentation module and the tags generated by the manual windowing module;
a tag mapping module that implements at least one of manual windowing and auto-segmentation on the one or more windows within the display medium; and
a merging module that merges the at least one manual tag and the at least one auto-segmentation tag and generates a final tag, wherein one or more least significant bits of the at least one manual tag are used to carry rendering, and one or more most significant bits of the at least one manual tag are used to control the merge with the at least one auto-segmentation tag.

5. The system of claim 4, wherein the manual tags are eight-bit wide.

6. The system of claim 4, wherein the tag mapping module implements at least one of manual windowing and auto-segmentation on the one or more windows within the display medium with the use of mapping tables.

7. An image processing device, comprising:
a controller; and
the enhanced manual windowing system of claim 4;
wherein the controller controls at least one of the tag auto-segmentation module, the manual windowing module, the tag selection module, the tag mapping module, and the merging module.

8. An image processing device comprising:
an image processor; and
the enhanced manual windowing system of claim 4;
wherein the image processor processes image data in accordance with the final tag set.

9. A computer-readable medium that provides instructions for manual windowing, the instructions, when executed by a processor, causing the processor to perform operations comprising:

defining at least one manual tag to be assigned to at least one window within a display medium;

assigning the defined manual tag to the at least one window;

auto-segmenting the at least one window to which at least one manual tag is assigned to produce at least one auto-segmentation tag;

mapping the at least one manual tag to the at least one auto-segmentation tag;

merging the at least one manual tag and the at least one auto-segmentation tag; and generating a final tag set based on the merging of manual and auto-segmentation tags, wherein one or more least significant bits of the manual tags are used to carry rendering, and one or more most significant bits of the manual tags are used to control the merge with the auto-segmentation tags.

* * * * *